Patented Jan. 26, 1932

1,843,058

UNITED STATES PATENT OFFICE

FRITZ WREDE, OF GREIFSWALD, GERMANY

SILVER SALT OF THIOCELLOBIOSE AND PROCESS OF PREPARING THE SAME

No Drawing. Application filed October 20, 1928, Serial No. 313,944, and in Germany October 27, 1927.

The present invention relates to the manufacture of the silver salt of thiocellobiose. This silver salt is considerably more stable than the already known silver salt of thioglucose. It also complies with all the requirements of pharmaceutical use in regard to ready solubility in water, high stability and disinfecting power. In addition, it is non-irritant and remarkably non-poisonous.

The thio derivatives of cellulose degradation products are obtained by converting bromoacyl derivatives of cellulose degradation products into the corresponding thio compounds according to the methods customarily used for the manufacture of such mercaptans. In particular thiocellobiose is obtained from the aceto-bromo-cellobiose described by Fischer and Zemplen (Ber. 43, 1910, page 2536).

The acyl compound of such thio cellobiose is split up according to the methods hitherto customary and converted into its salts. If the selected process of manufacture of the mercaptans does not lead directly to the same, but first to derivatives thereof or to the corresponding disulfide compounds, the resulting intermediate products are converted, according to the customary methods, into the corresponding mercaptans before being transformed into the silver salt.

The invention is illustrated by the following equations:

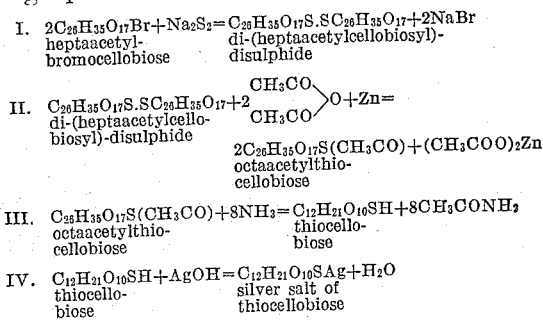

Example 14 parts by weight of acetobromocellobiose are dissolved in 360 parts by weight of hot absolute ethyl alcohol and treated with a methyl alcoholic solution of potassium polysulfide, obtained by dissolving 0.8 parts by weight of metallic potassium in 40 parts by weight of methyl alcohol, saturating one half of the solution with hydrogen sulfide, mixing with the other half of the potassium methylate solution and heating with 1 part by weight of sulfur. The mixed solutions rapidly become clear. On cooling the dicellobiosyl disulfide acetate separates. It is filtered after 12 hours and washed with water and alcohol. The substance forms a white powder which is almost insoluble in ether, petrol ether, alcohol and water, but readily soluble in chloroform. It possesses the melting point of 271–273° C.

One part by weight of the acetate is dissolved in 8 parts by weight of acetic acid anhydride and treated with two parts by weight of zinc dust with continuous stirring and heating. The filtrate is stirred with 10 times the quantity of water, whereupon the acetyl compound of the thiocellobiose separates in a crystalline form. It is re-crystallized several times from alcohol.

The compound crystallizes in white needles of the melting point 205° C. The acetate of the thiocellobiose is shaken for 20 hours at 0° C. with 10 times the quantity by weight of methyl alcoholic ammonia, the solution is evaporated in vacuo to ¼ of its volume and is treated with the calculated quantity of an alcoholic ammonia silver nitrate solution. The silver salt of the thio cellobiose precipitates as a white amorphous powder, which is filtered and dried. The substance forms a white powder, of good stability in air and very readily soluble in water and is intended to be used for pharmaceutical purposes.

I claim:—

1. Process for the manufacture of a silver salt of thiocellobiose which comprises treating acetobromocellobiose with an alcoholic solution of alkali-metal polysulphides, heating the solution of the dicellobiosyldisulphide thus formed in acetic acid anhydride with a finely divided metal having a reducing action, saponifying the acetyl compound of thiocellobiose formed and converting it into its silver salt with an alcoholic ammonia silver nitrate solution substantially as described.

2. The silver salt of thiocellobiose having the probable formula $C_{12}H_{21}O_{10}SAg$, which forms a white powder of good stability in air and is readily soluble in water.

In testimony whereof I have hereunto set my hand.

FRITZ WREDE. [L. S.]